Dec. 18, 1923.                                                1,477,672
O. STEGMANN
LUBRICATOR CUP
Filed March 27, 1922
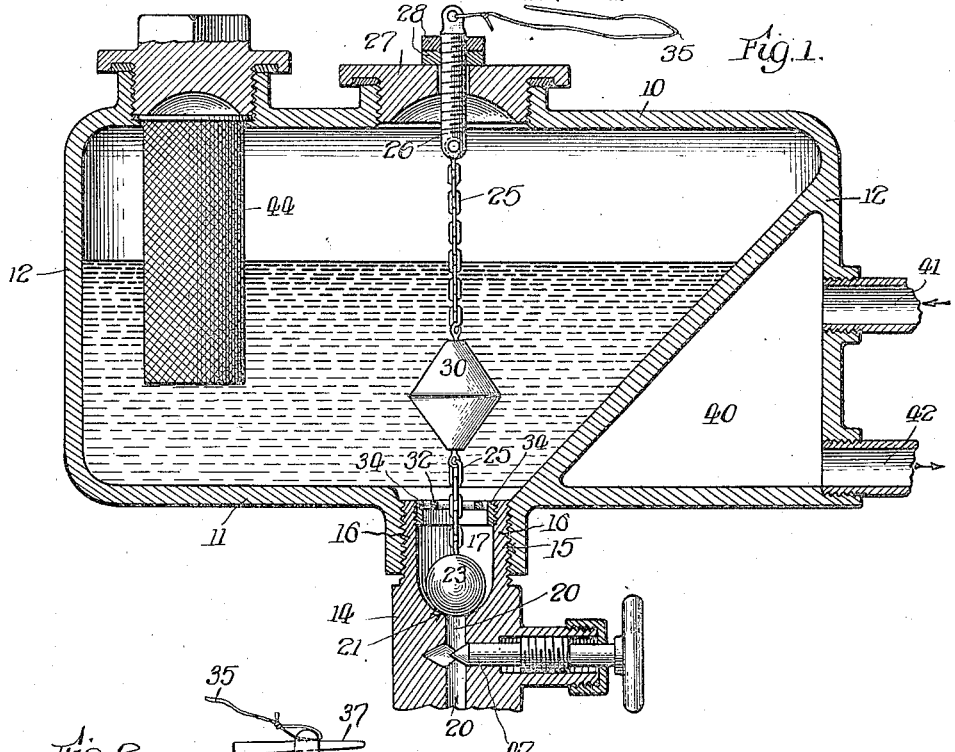
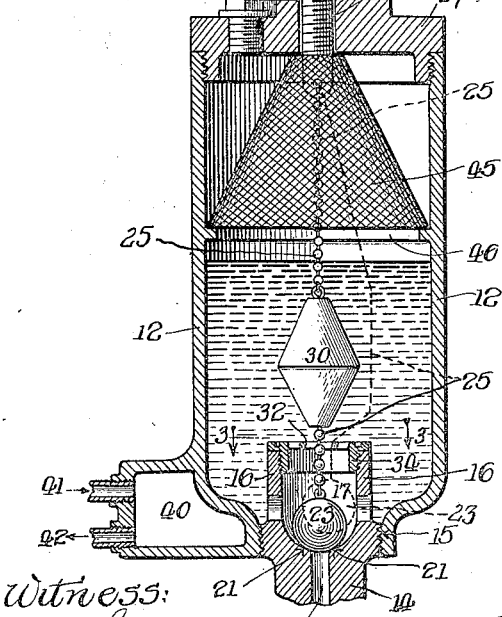
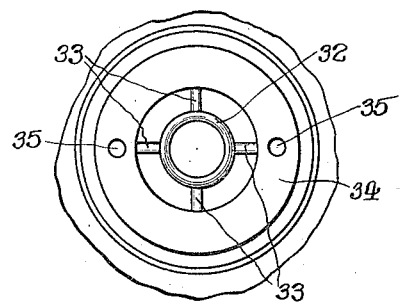
Inventor:
Otto Stegmann
By Luther Johns
Atty.
Witness:
A. J. Sauser Patented Dec. 18, 1923.

1,477,672

UNITED STATES PATENT OFFICE

OTTO STEGMANN, OF WILL COUNTY, ILLINOIS.

LUBRICATOR CUP.

Application filed March 27, 1922. Serial No. 547,255.

*To all whom it may concern:*

Be it known that I, OTTO STEGMANN, a citizen of the United States, residing in Will County, Illinois, have invented certain new and useful Improvements in Lubricator Cups, of which the following is a specification.

These improvements relate to devices of the kind adapted to supply or dispense a liquid, as oil for lubricating purposes, substantially only as needed, means being provided for preventing the flow of the liquid therefrom when the device with which it is used is not in actual operation. Devices for such a purpose have been suggested by others, as witness the patent to Lane, No. 1,360,768 of November 30, 1920 and that to Glass, No. 1,034,612 of August 6, 1912.

The principal object of the present improvements is to provide a dispensing device of the character described which is of simple construction and which is notably effective in operation to provide the desired flow as required while preventing a substantial wastage of the liquid at other times, one which is also strong and durable and not likely to get out of order. It is an object to improve and increase the efficiency of devices of this class. Other objects and advantages will appear hereinafter.

In the accompanying drawings, which form a part of this specification, Figure 1 shows a substantially medial vertical section through an oil cup device embodying these improvements in a preferred and highly advantageous form; Fig. 2 is a similar section through a somewhat modified form of the device; and Fig. 3 is an enlarged top view of the lower middle portion of the device of Fig. 2 as on the line 3—3 thereof.

Throughout the description like or aquivalent parts in all of the figures will be given the same reference characters.

The cup body may be of any approved form and is shown in Fig. 1 as having a top wall 10, a bottom wall 11 and side walls 12. In Fig. 2 the cup body may be considered cylindrical. In each instance there is a nipple-like normally-upwardly-extending part 14 upon which the oil cup is secured, as by threading at 15. This nipple-like part 14 has upwardly extending walls 16 defining the pocket, recess or socket 17 into the bottom of which enters or opens the discharge conduit 20. About this discharge opening 20 the walls of the part 14 are formed with an annular seat at 21, the walls at the seat being shown as spherically concave and on a somewhat larger diameter than that of the ball or sphere 23. The discharge conduit or opening 20 enters the seat at substantially the lowest part of the concave surface indicated at 21, and therefore the ball 23 will close the opening 20 through the action of gravity if the ball be merely allowed to find its natural resting place at the bottom of the recess or socket 17.

The ball 23 is a valve member adapted to open and close the discharge opening 20. It is preferably a sphere, or a considerable part of a sphere, as in some adjustments it may be so loosely positioned as to have various different areas act as the seal. It does not need to be spherical, even in the specific device shown, and still other forms of valve members adapted to open and close the conduit 20 are merely a matter of mechanical adoption. The important feature in this connection is that the valve shall close the discharge opening when the device is quiescent and be moved away or out of the closing position when the device as a whole is vibrated or moved laterally.

Means for moving the valve as 23 when the device is in use and is being vibrated or moved laterally by the motions of the machine by which it is carried are shown as being suspended from a point above the valve and discharge openings, the valve being carried by this suspended member which has a swinging movement from the point of suspension, the valve being caused to move when the suspending member swings; and this movement of the valve under the influence of the suspended member intermittently opens and closes the discharge conduit 20.

The swinging suspended member is pictured as a chain 25, two well-known types of chain being shown. The swinging member may also be described as being jointed or articulated and freely movable at its joints, and, in the form illustrated, it is a flexible member but is non-resilient.

The flexible non-resilient member 25 is shown as being connected to a supporting member 26 which is preferably movable in up-and-down directions, this member 26 extending loosely through the cap 27 and being held in place by a pair of nuts 28 threaded upon the supporting member 26. In Fig. 1 the threaded cap or cover 27 closes a threaded opening in the top wall 10, and in Fig. 2 the cap 27 threads directly into the side walls 12 and constitutes the top wall of the device. In each instance there is an opening in the cup structure above the valve and discharge openings 20 through which upper opening the parts may be positioned initially for use or easily removed from time to time. By means of the nuts 28 the effective length of the swinging member as 25 may be increased or decreased whereby the desired adjustment may be had initially and maintained from time to time or varied to meet particular requirements as, for instance, different consistencies of oil or different weather conditions.

In some instances a chain as 25 will swing sufficiently to move a valve member to open the conduit 20, but to insure the desired action I prefer to include a weight 30 intermediate the ends of the flexible, jointed, or swinging member 25, the weight being ordinarily substantially close to the bottom of the cup. This weight may be of considerable cubical content and, since it is usually surrounded by liquid which serves as resistance to its movement, its swingings are restrained and softened and severe impacts upon any of the parts are avoided.

The effect of the swinging movement of the member as 25 or 25—30 is to bow or arc this flexible member and thereby reduce the distance between its ends, the valve as 23 being thereby lifted away from the seat at 21 and permitting oil to enter the discharge opening 20. From time to time as the device is bodily vibrated or moved laterally the discharge conduit is thus intermittently opened and closed and enough oil for a particular purpose is permitted to escape from the cup. When the device as a whole is quiescent the valve remains in closing position.

By lowering the member 26 and allowing more slack in the member 25 the valve 23 will remain seated until the weight as 30 has moved a considerable distance, according to which adjustment liquid would be fed only under the influence of the larger bodily movements. On a locomotive, for instance, where there are numerous relatively large lateral movements of the machine the more loose condition of the chain 25 just mentioned would be effective, while on certain other machines in which the vibration is relatively slight, as for instance line shafting and floor machinery, it would be desirable to have the valve as 23 so nearly held suspended when the device is quiescent that relatively slight vibration will lift the valve away from the seat. This feature of adjustment of the effective length of the swinging member therefore renders the device well adapted for the desired use in a large variety of situations. It may be mentioned also that bodily vibration often causes a sort of jiggling motion of the weight, distinguished from the lateral swing, which also operates the valve.

In order that the valve 23 may not be drawn out of its operative position, as in the socket 17, under violent impulses when in use or when handling the device before installation or when removing it from time to time, I have shown a ring 32 held by arms 33 to a threaded ring 34 having wrench holes 35 and which is threaded into the upper end of the socket walls 16.

In assembling the device as illustrated the retaining member 32—33—34 is first made to surround the lower section of the chain 25, this section being then secured at its then free end either to the ball or to the weight, and thereupon the several parts may be lowered through the upper or top wall opening and held for retraction by a string 35. The retaining member 32—33—34 is then threaded into position by means of a tool inserted through the upper opening. Thereupon the string 35 may be passed through the hole in the cap 27, the member 26 may be drawn through that opening, the cap may then be screwed into place, and the nuts 28 may then be threaded upon the adjusting and supporting member 26 while being held against turning by means of a nail or rod 37 (Fig. 2). The original adjustment may be made in the shop by putting liquid into the cup and then lowering the valve as 23 until the liquid ceases to flow, and then either lowering the member 26 slightly further for a particular use or else tightening the nuts 28 upon each other as soon as the valve is found to be closed.

Since the periods during which the discharge conduit is open are usually short a very thick and viscous oil would not have the desired flow for effective operation, and where the device is used out of doors, as on a railway locomotive many parts of which often become completely encased in snow and ice notwithstanding the presence of the boiler, the oil in the cup is likely to become very thick and substantially non-mobile in winter. I have therefore provided a chamber 40 adjacent to the oil supply and having an intake 41 and an outlet 42 for steam or other heating fluid, the presence of such heat being adapted to maintain the oil in its desired fluid condition. I am aware that the use of a heating medium in connection with lubricating devices is not broadly new. The present use has, however, particular importance in connection with a device operated in the character of the one herein described since thereby the desired saving in oil may be effected throughout the winter months as well as during the warmer periods and the continuous use of such a device made possible. Furthermore, with the use of such a heating device the lubricant within the cup may be a materially heavy grease rendered fluid enough for dispensing by the device, the lubricant again assuming its character as grease at the place where lubrication is desired and the advantages of grease over oil thereby obtained in some situations.

In Fig. 1 the oil is poured into the cup through a strainer 44 of ordinary type. In Fig. 2 the strainer 45 is substantially in the form of hollow truncated cone with its apex portion upward and its lower part resting on an annular ridge 46, the valve supporting member 26 passing through the upper end of the strainer and the flexible member 25 being within the hollow interior thereof, the arrangement being such that room is provided within the strainer for the swinging movements of the member 25.

The hand valve 47, Fig. 1, is designed both to close the discharge opening 20 when it is desired to stop the machine for a material length of time or when it is desired to remove the oil cup for handling when it still has a material amount of oil therein, or the valve 47 may be so adjusted as to permit only a limited supply of the lubricant to pass should occasion therefore arise.

The several parts may be made according to practices well understood in the mechanic arts and all of them will ordinarily be made of metal.

I contemplate as being within the scope of the present invention various changes, modifications and departures from what is herein specifically illustrated and described, as indicated in the appended claims.

I claim:

1. The combination of walls forming an oil cup having an upwardly-directed discharge opening normally below the surface of the oil within the cup, said discharge opening being surrounded by walls forming a valve seat, a valve member adapted to rest upon said seat for closing the discharge opening, a non-resilient freely-flexible and freely-swinging element suspended from a relatively fixed part of the device above said valve member and connected at its lower end to said valve member, the length of said flexible member being such that when the device as a whole is quiescent said valve member closes the discharge opening and when the device as a whole is vibrated or moved laterally said flexible member assumes a bowed position shortening the distance between its point of suspension and its point of connection to said valve member, thereby lifting said valve member away from said discharge opening.

2. The combination of claim 1 hereof and in which the oil cup has a top wall and said top wall has an opening normally above the discharge opening, a readily removable cover for said top-wall opening, and means carried by said cover for holding the flexible member in suspended position.

3. The combination of claim 1 hereof and in which the oil cup has a top wall and the top wall has an opening normally above the discharge opening, a readily removable cover for said top-wall opening, a member normally extending substantially vertically and movably through said cover, and adjusting means associated with said substantially-vertically-movable member for adjusting it in up-and-down directions.

4. The combination of claim 1 hereof in which the flexible member comprises a plurality of parts flexibly jointed to each other.

5. The combination of claim 1 hereof in which the flexible member comprises relatively short sections jointed flexibly together.

6. The combination of claim 1 hereof in which the flexible member comprises chain-like elements.

7. The combination of claim 1 hereof in which the flexible member comprises chain-like elements, together with a weight intermediate the ends of the flexible member.

8. The combination of claim 1 hereof in which the flexible member includes chain sections and a weight intermediate two such sections, said weight being also intermediate the ends of the flexible member as a whole.

9. The combination of walls forming an oil cup having an upwardly-directed discharge opening normally below the surface of the oil within the cup, said discharge opening being surrounded by walls forming an annular valve seat, a valve member having a substantially spherical valve portion adapted to rest upon said seat for closing the discharge opening, a flexible member suspended from a relatively fixed part of the device normally above said valve member and connected at its lower end to said valve member, said flexible member including loosely-jointed sections and a weight intermediate the ends of the flexible member, the length of said flexible member being such that when the device as a whole is quiescent said valve member closes the discharge opening and when the device as a whole is vibrated or moved laterally said flexible member assumes a bowed position shortening the distance between the point of suspension of the flexible member and the point of its connection to said valve member, thereby lifting said valve member away from said discharge opening.

10. The combination of walls forming an oil cup, there being a discharge opening therein, valve means adapted to maintain said discharge opening closed when the device as a whole is quiescent, and means suspended to swing from a relatively fixed point above the discharge opening and connected to said valve means to move the valve means and open said discharge opening when said suspended member swings, said suspended member being adapted to swing under lateral movements of the device as a whole.

OTTO STEGMANN.